UNITED STATES PATENT OFFICE.

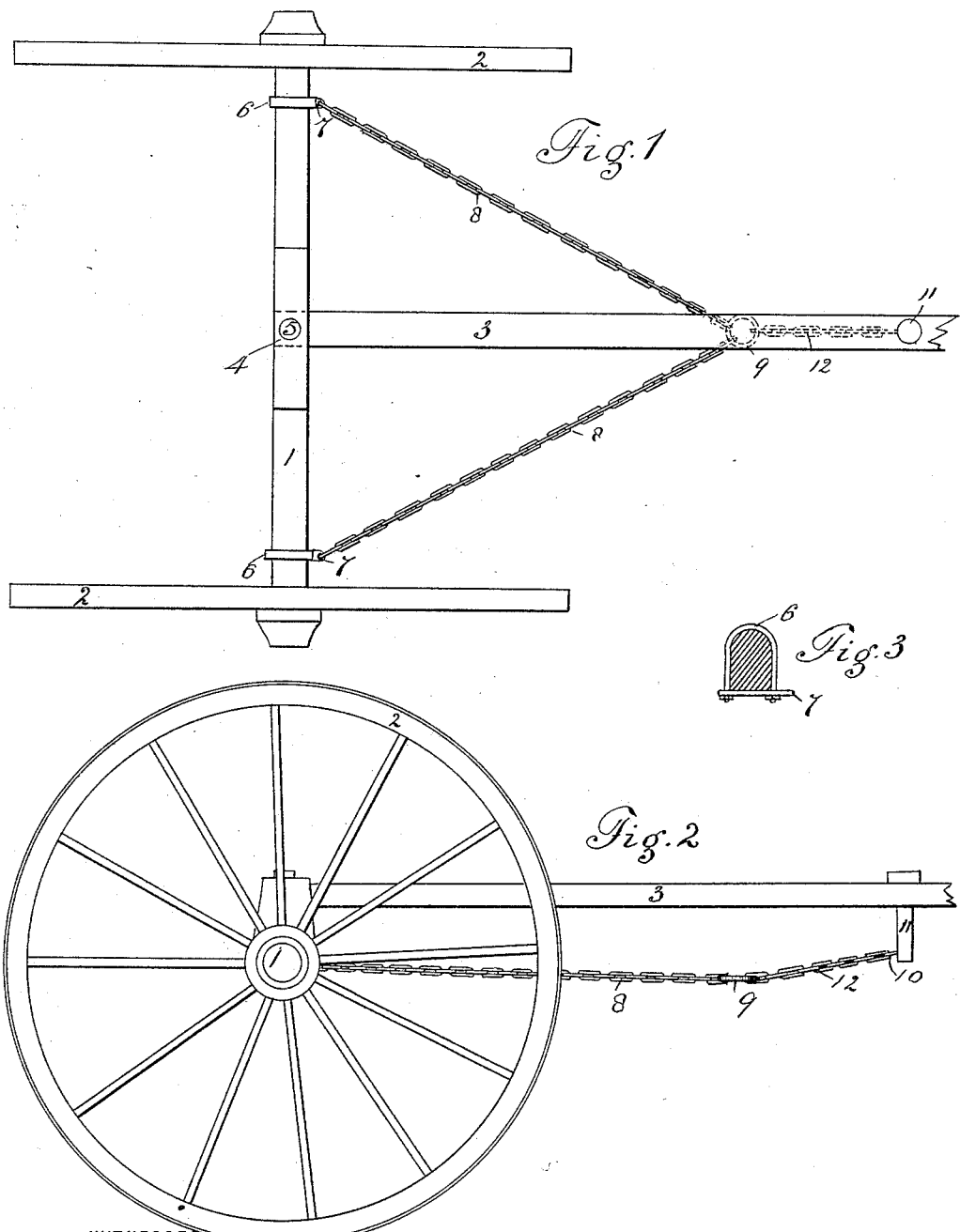

DANIEL C. FUNCHEON, OF DENVER, COLORADO, ASSIGNOR OF ONE-HALF TO GEORGE FUNCHEON, OF SAME PLACE.

AXLE-CHECK FOR VEHICLES.

SPECIFICATION forming part of Letters Patent No. 424,549, dated April 1, 1890.

Application filed January 28, 1890. Serial No. 338,330. (No model.)

*To all whom it may concern:*

Be it known that I, DANIEL C. FUNCHEON, a citizen of the United States, residing at Denver, in the county of Arapahoe and State of Colorado, have invented certain new and useful Improvements in Axle-Checks for Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in devices for preventing the forward wheels of a vehicle from coming in contact with the box or body of the vehicle in turning or cramping the same; and the object of my invention is to provide a device of the class stated which shall be simple in construction, economical in cost, reliable, durable, and effective for the purpose intended.

To these ends my invention consists of the features hereinafter described and claimed.

In the drawings is illustrated an embodiment of the invention, in which—

Figure 1 is a plan view of the forward portion of a vehicle with the device attached. Fig. 2 is a side elevation of the same. Fig. 3 is a vertical section taken through the axle and showing the manner of securing the device thereto.

The difficulty experienced in turning or cramping a vehicle by reason of the one wheel engaging the box or body on the side toward which the turn is made is well known to all, either from observation or experience in their use. My invention as herein set forth is believed to fully overcome this difficulty.

In the views of the drawings, let the reference-numeral 1 indicate the forward axle of a vehicle mounted upon the wheels 2, and having the reach 3 suitably secured to its central portion 4 by the king-bolt 5 in the ordinary way. The clips 6 near the wheels are provided with plates underneath the axle, through which the lower threaded extremities of the clips pass, and are secured in place by nuts screwed thereon and engaging the under surface of the plate. The rear extremity of each of these plates is provided with an eye or ring 7. To each of these eyes is fastened one extremity of a chain 8, the opposite extremity of each chain being secured to a ring or link 9, located directly beneath the reach when the forward axle occupies the position parallel with that of the rear axle. A third chain 12 is secured at its forward extremity to ring 9, the opposite extremity thereof being made fast to an eye 10, formed in or secured to a bolt 11, made fast to the reach, as shown. It will be observed that the two chains 8 may be one continuous chain, a central link therein taking the place of the ring 9, to which the other chain 10 is made fast.

In the operation of the device it will be observed that when the forward axle has turned sufficiently to bring the center of ring 9 in a direct line with the eyes 7 and 10 on one side of the reach the wheel on the opposite side of the reach cannot approach nearer the wagon-body, since the axle can turn no farther in that direction. The length of the chains 8 and 12 may be so regulated that when the center of ring 9 is in a direct line with the eyes 7 and 10, or when the movement of the axle in a given direction is checked, the wheel nearer the vehicle-body may be very close thereto, or as close as is desired without touching the same.

While chains are deemed preferable for use in the manufacture of my improvement, straps, cords, or ropes of sufficient strength may also be employed.

Having thus described my invention, what I claim is—

The combination, with the forward axle and the reach of a vehicle, of the chains 8 8, secured at their forward extremities to the axle, a ring or link 9, uniting their opposite extremities, a chain 12, connected with said ring at one extremity and suitably secured at its opposite extremity to the reach at a point in the rear of ring 9, substantially as described.

In testimony whereof I affix my signature in presence of two witnesses.

DANIEL C. FUNCHEON.

Witnesses:
   WM. MCCONNELL,
   G. J. ROLLANDET.